J. PLUCIENSKI.
FREIGHT LOADING AND UNLOADING CRANE.
APPLICATION FILED MAR. 22, 1920.

1,341,996.

Patented June 1, 1920.
2 SHEETS—SHEET 1.

INVENTOR.
John Plucienski
BY Harry D. Wallace
ATTORNEY.

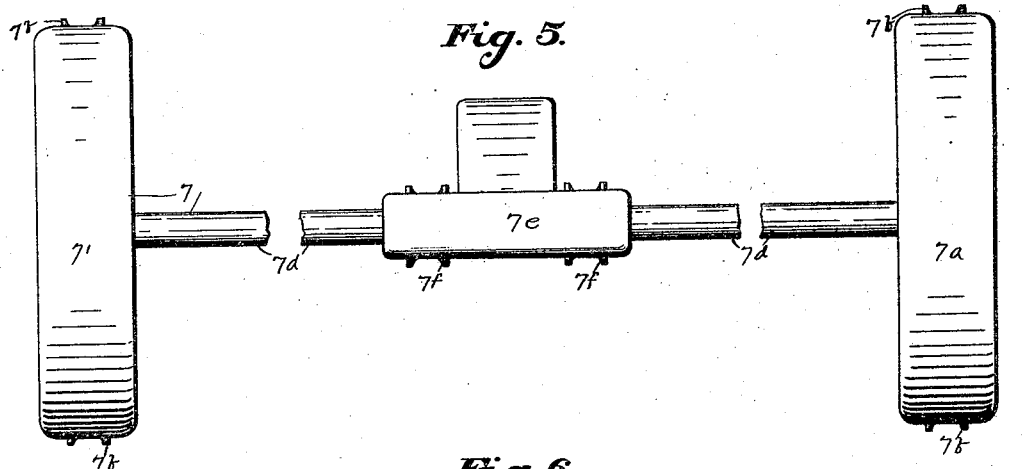
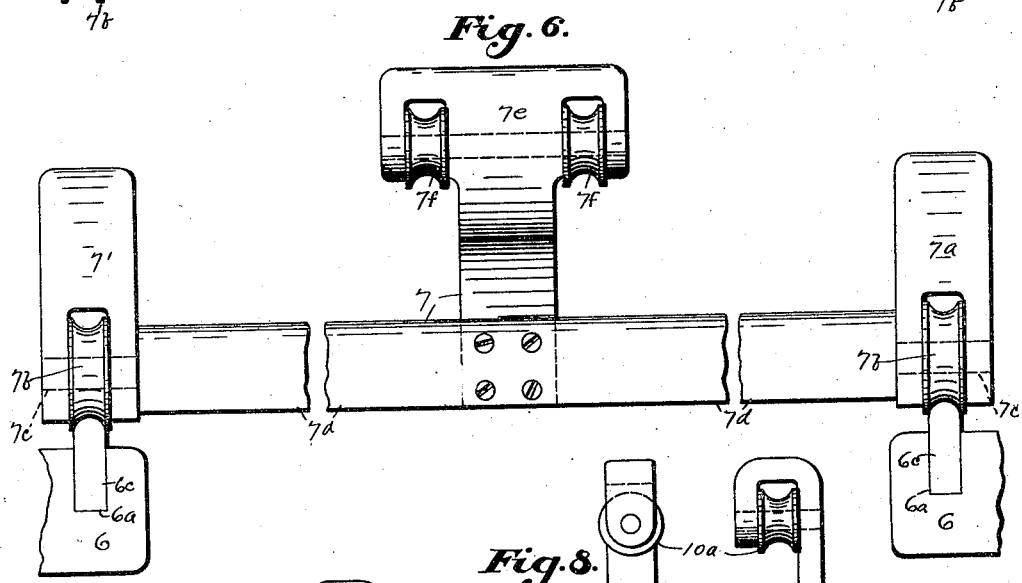
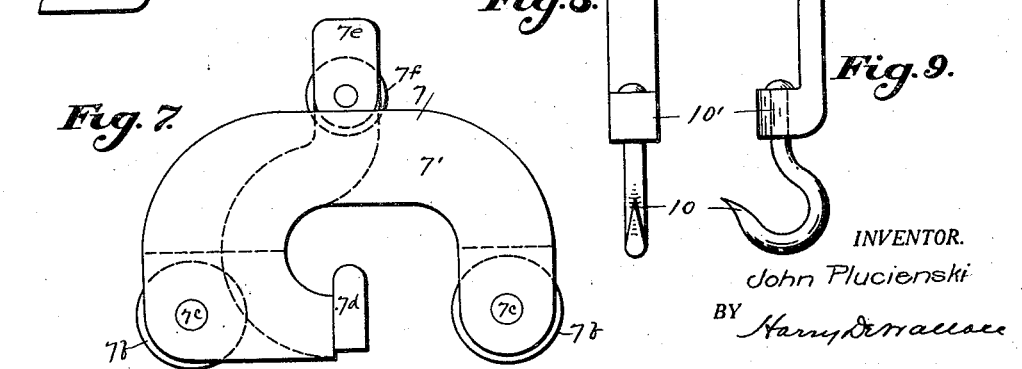
INVENTOR.
John Plucienski
BY Harry D. Wallace
ATTORNEY.

UNITED STATES PATENT OFFICE.

JOHN PLUCIENSKI, OF SYRACUSE, NEW YORK.

FREIGHT LOADING AND UNLOADING CRANE.

1,341,996.  Specification of Letters Patent.  Patented June 1, 1920.

Application filed March 22, 1920. Serial No. 367,955.

*To all whom it may concern:*

Be it known that I, JOHN PLUCIENSKI, a citizen of the United States, residing at Syracuse, in the county of Onondaga and State of New York, have invented certain new and useful Improvements in Freight Loading and Unloading Cranes, of which the following is a specification.

This invention relates to freight loading and unloading cranes, designed particularly for use by packing-houses and the like, for loading and unloading cars.

The object of the invention is to provide a plurality of novel, simple and convenient time and labor saving loading and unloading mechanisms, which are preferably disposed within and carried by refrigerator and other freight cars, the said mechanisms being in the nature of cranes, which are movable longitudinally in the cars, by means of a series of tracks, by which the cranes may be successively positioned, for receiving and discharging certain kinds of freight. And a further object is to provide a plurality of cranes of the class, each of which is equipped with a track member adapted to aline with the usual stationary over-head tracks commonly employed in packing-houses and other plants, for mechanically handling dressed meats and other heavy goods, the loading and unloading of the cars being readily and quickly effected, by simply trundling the goods, which are usually supported by hooks, directly into the cars, the said cranes, after each in its order is loaded, being moved toward the opposite ends of the cars, where the cranes remain and continue to support their loads while the cars are in transit. When the cars reach their destinations, the cranes with their loads of freight are moved back opposite the door openings of the cars and connected to the over-head tracks of the receiving coolers or storage-houses, into which the loads of the several cranes may be trundled, thus eliminating all physical labor, such as lifting and carrying the goods, shortening the loading and unloading periods, and greatly lessening the cost of such work.

My invention is described in detail in the subjoined specification, and illustrated by the accompanying drawings, in which—

Figure 1:
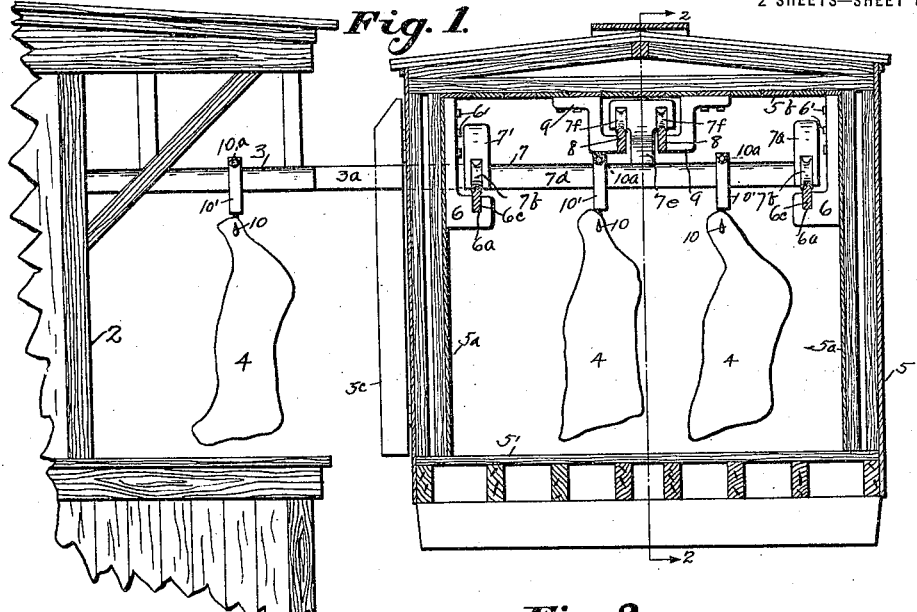
Figure 2:
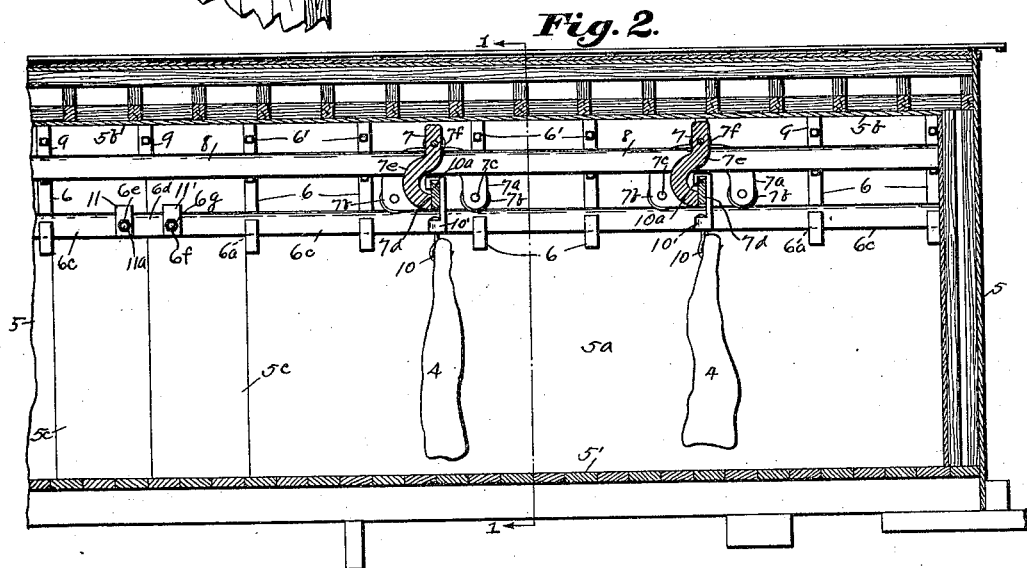
Figure 3:
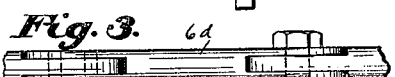
Figure 4:
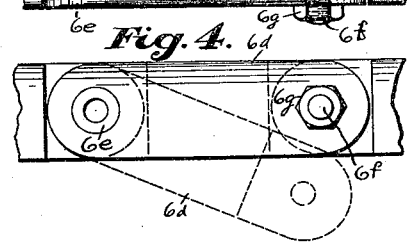

Figure 1 is a vertical cross-section through a refrigerator car, taken on line 1—1 of Fig. 2, and a broken view of a packing-house, to which my improvement is applied. Fig. 2 is a central vertical longitudinal section, taken on line 2—2 of Fig. 1. Fig. 3 is a fragmentary top view of one of the lateral sectional tracks which support the loading cranes, showing the means for temporarily connecting the sections. Fig. 4 is a side view of the same. Fig. 5 is an enlarged top-plan view of one of the cranes. Fig. 6 is a rear-side elevation of the same. Fig. 7 is an end elevation of the crane. And Figs. 8 and 9 are respectively, an edge and a side view of one of the wheel-hooks which support the pieces of freight.

In the drawings, 2 designates a portion of a packing or storage house, or like structure, which is shown equipped with the usual over-head track 3, for portably supporting quarters of beef, and the like 4 designates generally the body of a refrigerator or other freight car, having a floor $5'$, side walls $5^a$, ceiling $5^b$, and side-doors $5^c$. 6 designates similar L-shaped brackets, which are rigidly secured to the side walls of the car, preferably near the ceiling $5^b$, by bolts $6'$. The horizontal arms of the said brackets are preferably provided with upwardly facing slots $6^a$, which receive and support sectional rails $6^c$, the top edges of said rails projecting above said arms. The sections of the rails $6^c$ preferably extend unbroken from the ends of the car to a point opposite the central door openings, and their adjacent ends are preferably spaced sufficiently to allow the quarters of beef or other articles 4, to pass freely therebetween. At certain times, during the loading and unloading of the cranes, the gaps between the rail sections are required to be closed, so as to render the rails continuous throughout the length of the car. This is accomplished in a simple manner, by similar link-like parts $6^d$, which are provided with perforated forked ends, which receive the reduced perforated end portions of the rails $6^c$. One end of each link $6^d$ is permanently pivoted to one rail section, by a tubular bolt $6^e$, while a bolt $6^f$ detachably connects the opposite end of the link to the adjacent rail section. The bolts 6ᶠ are held in place by nuts 6ᵍ (see Figs. 2, 3 and 4). When the links 6ᵈ are not required for closing the said gaps, the bolts 6ᶠ are withdrawn, and the links allowed to gravitate out of the way, by pivoting on the tubes 6ᵉ, as shown by dotted lines in Fig. 4.

7 designates one of a plurality of similar cranes or carriages, which are partially supported by the rails 6ᶜ, and are adapted to be moved back and forth in the car 5 during the loading and unloading operations. Each crane 7 consists of similar heads 7′ and 7ᵃ, which are shaped like an inverted U, the depending arms of said heads being slotted to receive grooved wheels 7ᵇ, which are pivoted to said arms by pins or axles 7ᶜ, and the said wheels are supported by the rails 6ᶜ. The heads 7′ and 7ᵃ are rigidly tied together by a rail or bar 7ᵈ, which extends transversely across the interior of the car. The rails 7ᵈ are preferably disposed in a plane that corresponds to the plane of the rail 3 of the cooler 2, and during the loading and unloading of a car, the rail 3 and the rails 7ᵈ of the cranes are joined together by a connecting link or part 3ᵃ, as shown in Fig. 1. By this provision, the carcasses 4, may be trundled from the cooler 2 directly into the car 5, without requiring the operators to either lift or carry the freight (see Fig. 1). To each rail 7ᵈ of the cranes, is rigidly secured an upwardly projecting arm 7ᵉ, which is positioned substantially midway between the heads of the crane. The arms 7ᵉ are each provided with two or more grooved wheels 7ᶠ, which are supported by parallel rails 8, and each of the rails 8 in turn, is supported by a plurality of similar brackets 9, which are rigidly secured to and depend from the ceiling 5ᵇ, as shown in Figs. 1 and 2. The rails 8 share with the rails 6ᶜ, the weight of the loaded cranes. The tracks 8 are preferably continuous throughout the length of the car, and are preferably supported in the brackets 9 by gravity, so as to permit their ready detachment, in case it is desired to remove either or all of the cranes 7. The pieces of meat or other freight 4, are usually hung on hooks 10, which are swiveled in the lower ends of holders 10′, to whose upper ends are pivoted grooved rollers 10ᵃ, the latter engaging and rolling on the tracks 3 and 7ᵈ, as shown in Figs. 1 and 2. During the loading operations, the unloaded cranes 7 are usually disposed in one end of the car, and as each crane receives its load from the cooler, the said crane is trundled toward the opposite end, and so on, until all of the cranes are loaded. After the loaded cranes are disposed at the opposite sides of the door openings, stops 11 are applied to the spaced ends of the rails 6ᶜ, for preventing the cranes from traveling back and forth by reason of the jarring and jolting of the car while in transit. The stops 11 are held in place by the bolts 6ᶠ, while the stops 11′ are held by bolts 11ᵃ which pass through the tubes 6ᵉ, as shown in Fig. 2.

Having thus described my invention, what I claim, is—

1. The combination with a railway car having side openings to receive and discharge freight, of a plurality of cranes operatively mounted, and adapted to be moved longitudinally in the car for receiving, carrying and discharging freight, each of said cranes having a freight supporting rail adapted to be positioned opposite said openings in line with over-head tracks of packing-houses and other plants, sectional tracks for partially supporting said cranes mounted on the inner side walls of the car, and a pair of continuous tracks suspended from the ceiling of the car for supporting the medial portions of said cranes.

2. The combination with a car having side door openings, of a plurality of sectional tracks mounted on the inner lateral walls of the car, a pair of continuous tracks disposed between and parallel to the sectional tracks, a plurality of cranes adapted to be trundled longitudinally on said tracks, each of said cranes having a freight supporting member adapted to aline with the opposite door openings for receiving and discharging freight, and means for rendering said sectional rails continuous for permitting the trundling of said cranes from one end of the car to the other.

3. The combination with the body of a car having side door openings, of a sectional track secured to each side wall of the car, the sections being spaced apart opposite said door openings for the passage of freight, a plurality of cranes partially supported by said sectional tracks and movable longitudinally toward and away from said door openings, freight supporting rails carried by said cranes and disposed transversely in the car adapted to be positioned in line with said door openings during the receiving and discharging of the freight, a pair of continuous tracks supported by the ceiling of the car parallel to and in a higher plane than the sectional tracks, and arms carried by the rails of the cranes movable between and supported by said continuous tracks.

4. In a freight loader and carrier, the combination with a car having side door openings, of tracks mounted on the inner side walls of the car, said tracks arranged in sections which are spaced apart at said door openings, links for temporarily closing the gaps between said sections, continuous tracks disposed along the line of the longitudinal axis of the car, brackets depending from the ceiling of the car and supporting said continuous tracks, a plurality of wheel-cranes disposed in the car, said cranes supported by said tracks and movable longitudinally in the car and adapted to be successively positioned opposite said door openings for the receipt and discharge of freight, said cranes after receiving their loads of freight at the door openings adapted to be rolled on said tracks toward the ends of the car and to retain their loads during the transition of the car, and means for preventing the accidental movement of said cranes while the car is in transit.

In testimony whereof I affix my signature.

JOHN PLUCIENSKI.